United States Patent
Polizzi et al.

[11] Patent Number: 6,000,822
[45] Date of Patent: Dec. 14, 1999

[54] DOOR MOUNTED INTERIOR LIGHTING

[75] Inventors: Joseph Anthony Polizzi, Mt. Clemens; Robert Michael Orth, Clinton Township, both of Mich.

[73] Assignee: General Motors Corporation, Detroit, Mich.

[21] Appl. No.: 08/738,853

[22] Filed: Oct. 28, 1996

[51] Int. Cl.⁶ ............................................. F21Q 1/00
[52] U.S. Cl. ............................................. 362/488; 362/501
[58] Field of Search .................................. 362/61, 80, 83.3

[56] References Cited

U.S. PATENT DOCUMENTS

| | | | |
|---|---|---|---|
| 3,452,190 | 6/1969 | Senseman | 362/80 |
| 4,310,871 | 1/1982 | Adachi | 362/80 |
| 4,670,819 | 6/1987 | Boerema et al. | 362/80 |
| 5,025,352 | 6/1991 | Brown | 362/83.3 |
| 5,297,010 | 3/1994 | Camarota et al. | 362/80 |
| 5,599,086 | 2/1997 | Dutta | 362/83.3 |

*Primary Examiner*—Laura Tso
*Attorney, Agent, or Firm*—Charles E. Leahy; Kathryn A. Marra

[57] ABSTRACT

The vehicle has a door movably mounted adjacent an occupant's seat and a pull strap by which the occupant may pull the door closed. A lamp is mounted on the door at a position generally outboard and concealed behind the pull strap. The pull strap is vertically located in relation to the occupant and the lap in a position so that light emanating from the lamp is directed onto the occupant lamp for reading when the door is closed and, simultaneously, shielded from shining into the occupant's eyes by the pull strap. When the door is swung open, the light shines down on the roadway.

2 Claims, 2 Drawing Sheets

DOOR MOUNTED INTERIOR LIGHTING

TECHNICAL FIELD

The invention relates to mounting of a lamp on the vehicle door at a location behind a door mounted pull strap so that the pull strap shields the light from shining into the eyes of a seated occupant.

BACKGROUND OF THE INVENTION

It is well known to provide lighting in the interior of a motor vehicle for convenience of the occupant. In order to provide general interior lighting and also facilitate reading of a document by the seated occupant, it is known to mount a lamp on the vehicle roof, or on the underside of the rear-view mirror, or on the sun visor. It is also desirable to provide lighting on the vehicle door to provide lighting for the occupant foot space and to also shine upon the roadway when the vehicle door is swung open.

The present invention provides a new and improved interior lighting arrangement for a motor vehicle.

SUMMARY OF THE INVENTION

According to the invention, the vehicle has a door movably mounted adjacent an occupant's seat and a pull strap by which the occupant may pull the door closed. A lamp is mounted on the door at a position generally outboard and concealed behind the pull strap. The pull strap is vertically located in relation to the occupant and the lap in a position so that light emanating from the lap is directed onto the occupant lamp for reading when the door is closed and, simultaneously, shielded from shining into the occupant's eyes by the pull strap. When the door is swung open, the light shines down on the roadway.

These and other features, objects and advantages of the invention will become apparent upon consideration of the Description of the Preferred Embodiment and the appended drawings in which:

FIG. 1 is a rear elevation view of a motor vehicle body having a lighting arrangement according to the invention, and FIG. 2 is a plan view looking down on the lighting arrangement.

DESCRIPTION OF THE PREFERRED EMBODIMENT

Figure 1:
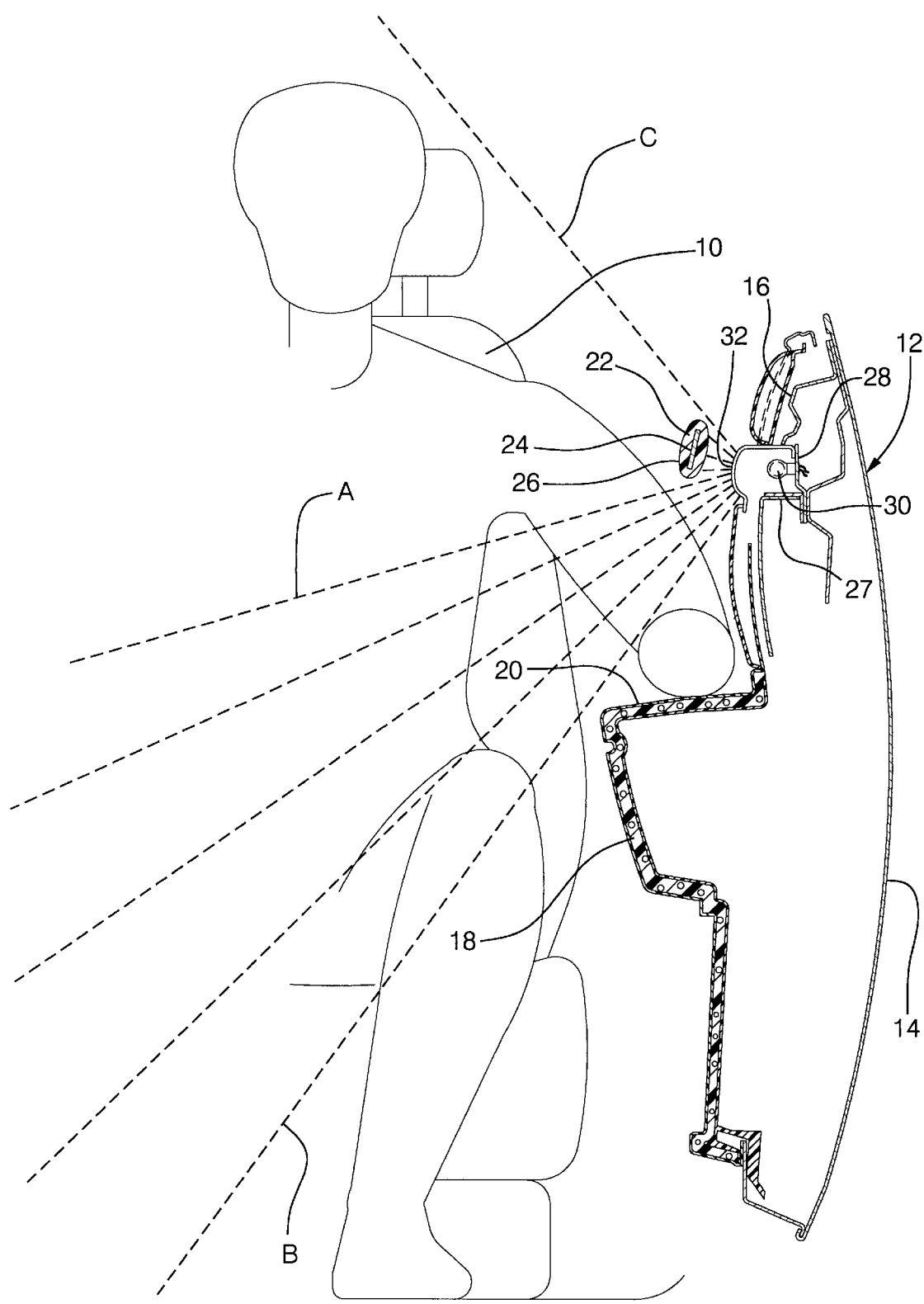
Figure 2:
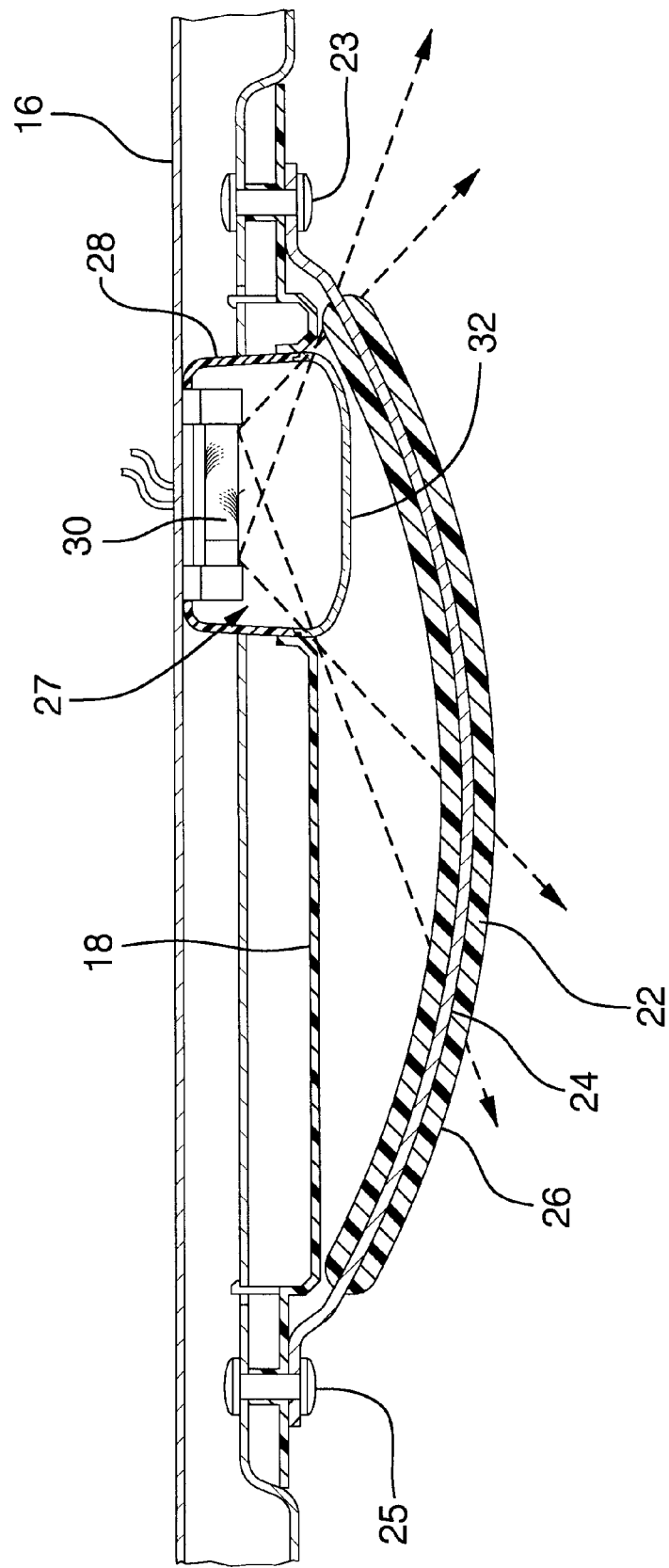

As seen in the drawings, the motor vehicle includes an occupant seat 10 which is located adjacent a hingedly mounted door 12. The door includes an outer panel 14 and an upper reinforcement 16. The inner wall of the door facing the occupant seat is defined by a door trim panel 18 which includes an arm rest portion 20. A padded pull strap 22 is mounted on the door and is generally comprised of a metal strip 24 which is wrapped in a vinyl covering 26. The pull strap is spaced away from the trim panel 18 to permit the occupant to grip the strap 22 and pull the door closed from an open position. The ends of the metal strip 26 are suitably screwed to the door 12 by rivets 23 and 25.

According to the invention, a lamp assembly 27 including a housing 28, lamp 30 and lens 32 is mounted on the door 12. As seen in the drawing, the lamp housing 28 is conveniently mounted on the upper reinforcement 16 and the lens 32 extends through an opening provided in the door trim panel 18.

As seen in the drawing, the lamp assembly 27 and the pull strap 22 are mounted relative one another so that the lamp assembly 27 is concealed and hidden behind the pull strap 22. In particular, as seen in the drawing, the light from the lamp assembly 27 emanates generally downward into a radiant zone in which the top of the radiant zone, designated A, is limited by the presence of the lower edge of the pull strap and the bottom of the radiant zone, designated B, is defined by the arm rest portion 20 of the door trim panel 18. Furthermore, as shown in the drawing, it is seen that the pull strap is effective to define a shielded zone with a lower edge designated A and an upper edge, designated C. In this manner, the pull strap functions to shield the lamp assembly 27 so that light cannot shine into the eyes of the seated occupant.

It will be understood that when the vehicle door is unlatched and pushed to the open position, the radiant zone defined between the upper limit A and lower limit B will move outward to shine downwardly on the pavement for convenience of occupant ingress and egress.

Thus, it is seen that the invention provides a new and improved lighting arrangement for a motor vehicle in which a door mounted pull strap shields a door mounted lamp assembly from shining into the occupant's eyes while at the same time defining a radiant zone by which the lamp assembly shines onto the occupant's lamp for reading and also shines onto the roadway when the door is pushed open.

We claim:

1. In a motor vehicle having a door movably mounted adjacent an occupant seat and having a pull strap extending inboard from the door by which the occupant may pull the door closed, the improvement comprising:

a lamp, means mounting the lamp on the door at a position generally outboard of the pull strap and hidden and concealed by the pull strap, the lamp is located above the occupant's lap to shine on the occupant's lap when the door is closed, wherein the lamp and the pull strap are located in relation to each other and to the occupant so that light emanating from the lamp is directed onto the occupant lap when the door is closed while simultaneously the pull strap conceals the lamp from view by the occupant so that the lamp is thereby shielded by the pull strap from shining into the occupant's eyes.

2. The improvement of claim 1 wherein the lamp shines onto the ground when the door is opened.

* * * * *